United States Patent
Sugawara

(10) Patent No.: US 12,546,919 B2
(45) Date of Patent: Feb. 10, 2026

(54) OPTICAL LAMINATE, METHOD FOR PRODUCING SAME, AND USE OF SAME

(71) Applicant: Daicel Corporation, Osaka (JP)

(72) Inventor: Yoshitaka Sugawara, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 831 days.

(21) Appl. No.: 17/625,839

(22) PCT Filed: Jun. 4, 2020

(86) PCT No.: PCT/JP2020/022111
§ 371 (c)(1),
(2) Date: Jul. 1, 2022

(87) PCT Pub. No.: WO2021/075082
PCT Pub. Date: Apr. 22, 2021

(65) Prior Publication Data
US 2022/0365246 A1    Nov. 17, 2022

(30) Foreign Application Priority Data

Oct. 17, 2019  (JP) ................................. 2019-190256

(51) Int. Cl.
| | | |
|---|---|---|
| G02B 5/00 | (2006.01) | |
| B29D 11/00 | (2006.01) | |
| G02B 1/11 | (2015.01) | |
| G02B 5/02 | (2006.01) | |
| G02F 1/1335 | (2006.01) | |
| H10K 59/80 | (2023.01) | |

(52) U.S. Cl.
CPC ........ G02B 5/0294 (2013.01); B29D 11/0073 (2013.01); G02B 1/11 (2013.01); *G02F 1/133502* (2013.01); *H10K 59/8791* (2023.02)

(58) Field of Classification Search
CPC ......... G02B 1/11; G02B 5/0294; G02B 1/111; G02B 5/02; G02B 5/28; G02B 27/0018; B29D 11/0073; G02F 1/133502; H10K 50/86; H10K 59/8791; H10K 59/50; B32B 7/023; G09F 9/00; H05B 33/02

USPC ......................................................... 359/601
See application file for complete search history.

(56) References Cited

U.S. PATENT DOCUMENTS

| | | |
|---|---|---|
| 8,493,660 B2 | 7/2013 | Furui et al. |
| 2008/0057228 A1 | 3/2008 | Horie et al. |
| 2020/0264340 A1 | 8/2020 | Sugawara et al. |

FOREIGN PATENT DOCUMENTS

| | | | | |
|---|---|---|---|---|
| JP | 2008-58723 A | | 3/2008 | |
| JP | 2016-24623 A | | 2/2016 | |
| JP | 2016024623 A | * | 2/2016 | |
| JP | 2018-97187 A | | 6/2018 | |
| KR | 10-2013-0049202 A | | 5/2013 | |
| KR | 10-1421757 B1 | | 7/2014 | |
| WO | WO-2019116664 A1 | * | 6/2019 | ............... B05D 5/06 |

OTHER PUBLICATIONS

International Search Report, issued in PCT/JP2020/022111, dated Aug. 25, 2020.
Japanese Notice of Reasons for Refusal, issued in Priority Application No. 2019-190256, dated Aug. 18, 2020.
Written Opinion of the International Searching Authority, issued in PCT/JP2020/022111, dated Aug. 25, 2020.
Korean Office Action for Korean Application No. 10-2022-7009622, dated Feb. 2, 2024, with English translation.
English translation of the International Preliminary Report on Patentability and Written Opinion of the International Searching Authority for International Application No. PCT/JP2020/022111, dated Apr. 28, 2022.

* cited by examiner

*Primary Examiner* — Henry Duong
(74) *Attorney, Agent, or Firm* — Birch, Stewart, Kolasch & Birch, LLP

(57) ABSTRACT

Provided is an optical laminate produced by disposing an anti-glare layer on at least one side of a light-transmitting substrate, the anti-glare layer having a surface that has the arithmetic mean peak curvature Spc of 1.5 mm$^{-1}$ or less in absolute value, the optical laminate has the adjusted transmission image clarity of 85% or less. On the anti-glare layer, further disposed is a low refractive index layer. The optical laminate including the low refractive index layer may have a luminous reflectance of 1.4 or less. The optical laminate improves the anti-glare properties.

13 Claims, No Drawings

OPTICAL LAMINATE, METHOD FOR PRODUCING SAME, AND USE OF SAME

TECHNICAL FIELD

The present disclosure relates to an optical laminate capable of suppressing the glare on the display surface in various display devices such as a liquid crystal display device (LCD) with a touch screen and an organic electroluminescence (EL) display, and relates to a method of producing the optical laminate and a use of the optical laminate.

BACKGROUND ART

Anti-glare films are widely used as films for preventing reflection of outside scenery on a display surface of an image display device, such as a liquid crystal display device (LCD) and an organic electroluminescence (EL) display, suppressing sparkle, and improving visibility. In an anti-glare film, recesses and protrusions are formed on its surface to impart anti-glare properties by scattered reflection of external light. In addition, a layer having a low refractive index, a low refractive index layer in another word, is provided for reducing the luminous reflectance on the recesses and protrusions to reduce the sense of reflection, and thus, the anti-glare properties are further improved.

JP 2008-58723 A (Patent Document 1) discloses an anti-glare film including an anti-glare layer and a low refractive index layer that is formed on at least one face of the anti-glare layer and includes a low refractive index resin and hollow silica particles, and having an internal haze value from 0 to 1%, a haze value from 5 to 6.5%, a transmission image clarity from 20 to 30%, and a reflected light tinge in which a* is from 0.5 to 1.3 and b* is from −2.3 to −0.5.

CITATION LIST

Patent Document

Patent Document 1: JP 2008-58723 A

SUMMARY OF INVENTION

Technical Problem

However, the known anti-glare films such as the one disclosed in Patent Document 1 have failed to impart high anti-glare properties, demanded by recent image display apparatuses or devices including LCDs and organic electroluminescence (EL) displays, in which high definition has been further advanced.

In light of the above, an object of the present disclosure is to provide an optical laminate with enhanced anti-glare properties, a method of producing the same, and a use of the same.

Solution to Problem

The present inventor has investigated the above mentioned point that the known anti-glare films have failed to impart high anti-glare properties, and found that in a known anti-glare film, the recesses and protrusions on the surface does not exhibit high anti-glare properties. Also found is that a low refractive index layer disposed on the anti-glare layer does not properly fit to the recesses and protrusions of the anti-glare layer, and the antireflection property is reduced compared to when a layer without recesses and protrusions is used. As a result of intensive studies to achieve the above-described object, the present inventor has found that the anti-glare properties improve by disposing an anti-glare layer on at least one side of a light-transmitting substrate, the anti-glare layer having the arithmetic mean peak curvature Spc of 1.5 mm$^{-1}$ or less in absolute value on its surface and adjusting the transmission image clarity of the optical laminate to 85% or less, and thus completed the present invention.

That is, the optical laminate according to an embodiment of the present disclosure includes a light-transmitting substrate and an anti-glare layer disposed on at least one side of the light-transmitting substrate, the anti-glare layer having recesses and protrusions on its surface, wherein the optical laminate has a transmission image clarity of 85% or less, as measured by an optical comb with a comb width of 0.5 mm, and an arithmetic mean peak curvature Spc of 1.5 mm$^{-1}$ or less in absolute value on the surface of the anti-glare layer. The anti-glare layer may further include a low refractive index layer. The optical laminate including the low refractive index layer may have a luminous reflectance of 1.4 or less. The low refractive index layer may have an arithmetic mean peak curvature Spc of 1.5 mm$^{-1}$ or less in absolute value on its surface. The absolute value of the arithmetic mean peak curvature Spc of the low refractive index layer surface may be from 0.3 to 2 times the absolute value of the arithmetic mean peak curvature Spc of the glare layer surface. The anti-glare layer may have a refractive index of 1.53 or less. The low refractive index layer may have a refractive index of 1.37 or greater. The anti-glare layer surface may have a developed interfacial area ratio Sdr of 0.003% or less. The anti-glare layer surface may have a root mean square slope Sdq of 0.007 or less. The anti-glare layer surface may have an arithmetic mean height Sa of 0.03 µm or greater. The optical laminate may have a haze value of 1% or less. The anti-glare layer is preferably free of a particle.

An embodiment of the present disclosure also includes a method of producing the optical laminate, the method including an anti-glare layer forming step of forming recesses and protrusions on a surface of the anti-glare layer by phase separation through liquid phase spinodal decomposition. The method may further include a low refractive index layer forming step of disposing a low refractive index layer on the anti-glare layer.

An embodiment of the present disclosure also includes a display device including the optical laminate. The display device may be a liquid crystal display device (LCD) or an organic EL display.

Advantageous Effects of Invention

In an embodiment of the present disclosure, an anti-glare layer is disposed on at least one side of a light-transmitting substrate, the anti-glare layer having the arithmetic mean peak curvature Spc of 1.5 mm$^{-1}$ or less in absolute value on its surface, and the transmission image clarity of the optical laminate is adjusted to 85% or less, and as a result, the anti-glare properties improve. Furthermore, the anti-glare layer has excellent fit to a low refractive index layer, and lamination of a low refractive index layer with high fit to the anti-glare layer is achieved by a predetermined lamination method of a low refractive index layer. Therefore, the antireflection property is also improved, and thus the anti-glare properties and the antireflection property that are difficult to achieve at the same time is simultaneously improved. In addition, the transparency is excellent, and haze is reduced. Furthermore, the antireflection property is improved without an excessively large refractive index of the anti-glare layer, and therefore the visibility is also improved.

DESCRIPTION OF EMBODIMENTS

Anti-Glare Layer

An optical laminate according to an embodiment of the present disclosure includes an anti-glare layer having recesses and protrusions, the anti-glare layer having the arithmetic mean peak curvature Spc of 1.5 mm$^{-1}$ or less in absolute value on its surface.

The absolute value of the arithmetic mean peak curvature Spc of the anti-glare layer surface is to be 1.5 mm$^{-1}$ or less, and is, for example, from 0.1 to 1.5 mm$^{-1}$, preferably from 0.5 to 1.4 mm$^{-1}$, more preferably from 0.8 to 1.3 mm$^{-1}$, and still more preferably from 1 to 1.2 mm$^{-1}$. If the absolute value of Spc is too large, the fit of the low refractive index layer deteriorates, and the antireflection property is not improved even if the anti-glare layer is laminated with the low refractive index layer.

The arithmetic mean height Sa of the anti-glare layer surface may be 0.03 μm or greater, and is, for example, from 0.03 to 0.1 μm, preferably from 0.04 to 0.09 μm, more preferably from 0.05 to 0.08 μm, and still more preferably from 0.06 to 0.075 μm. If Sa is too small, the anti-glare properties may deteriorate.

The root mean square slope Sdq of the anti-glare layer surface may be 0.007 or less, and is, for example, from 0.001 to 0.007, preferably from 0.003 to 0.0068, more preferably from 0.005 to 0.0065, and still more preferably from 0.006 to 0.0063. If Sdq is too large, there is a possibility that the fit of the low refractive index layer deteriorates, and that the antireflection property is not improved even if the anti-glare layer is laminated with the low refractive index layer.

The developed interfacial area ratio Sdr of the anti-glare layer surface may be 0.003% or less, and is, for example, from 0.0001 to 0.003%, preferably from 0.0005 to 0.0028%, more preferably from 0.001 to 0.0025%, and still more preferably from 0.0015 to 0.002%. If Sdr is too large, there is a possibility that the fit of the low refractive index layer deteriorates, and that the antireflection property is not improved even if the anti-glare layer is laminated with the low refractive index layer.

In an embodiment of the present disclosure, the anti-glare properties by the light scattering function and the fit to the low refractive index layer is improved in a well-balanced manner by combining Sa, Sdq, and Sdr in the above-described ranges with Spc having the above-described range on the recesses and protrusions on the anti-glare layer surface.

Note that in the present specification including claims, Spc, Sa, Sdq, and Sdr of the anti-glare layer surface and those of the surface of the low refractive index layer described below may be measured by a method according to ISO 25178, and more specifically, may be measured by a method described in Examples below.

The refractive index of the anti-glare layer may be 1.53 or less, and is, for example, from 1.4 to 1.53, preferably from 1.45 to 1.53, more preferably from 1.48 to 1.53, and still more preferably from 1.5 to 1.53. In the present disclosure, the antireflection property is improved even if the refractive index of the anti-glare layer is relatively low. If the refractive index is too high, there is a possibility that the refractive index between the anti-glare layer and the light-transmitting substrate is large, and that interference of the reflected light generates a fringe pattern, resulting in deterioration of the visibility.

Note that in the present specification including claims, the refractive index of the anti-glare layer and that of the low refractive index layer described below can be measured by a method according to JIS K7142, and more specifically, can be measured by a method described in Examples below.

It is sufficient that at least one side of the light-transmitting substrate described below is laminated with the anti-glare layer, but from the perspective of handleability, mechanical properties, productivity, and the like, one side (only one face) of the substrate layer is preferably laminated.

The thickness (average thickness) of the anti-glare layer is, for example, from 1 to 20 μm, preferably from 1.5 to 10 μm, more preferably from 2 to 8 μm, and still more preferably from 4 to 7 μm.

Note that in the present specification including claims, the average thickness of each layer is determined by measuring arbitrary 10 portions using an optical film thickness meter, and calculating the average value.

It is sufficient that the anti-glare layer has the above-described properties and the properties of the optical laminate described below, and the material of the anti-glare layer is not particularly limited. The material included in the anti-glare layer is selected from various transparent organic materials, such as thermoplastic resins, thermosetting resins, and photocurable resins, and inorganic materials, such as glass, ceramics, and metals, and is preferably a cured product of a curable composition including a curable resin and a polymer component from the perspective of possibility of forming recesses and protrusions by liquid phase spinodal decomposition and ease of forming the recesses and protrusions on the surface.

Curable Resin

The curable resin may be either a thermosetting resin or a photocurable resin, but from the perspective of productivity and the like, a photocurable resin is preferable. Photocurable resins or photocurable resin precursor components are a compound capable of forming a resin by curing or crosslinking using an active energy ray such as an ultraviolet ray or an electron beam, and is classified into fluorine-free photocurable resins and fluorine-containing photocurable resins.

Examples of the fluorine-free photocurable resin include a monomer and an oligomer, or resin, in particular, a low molecular weight resin.

Examples of the monomer include monofunctional monomers [(meth)acrylic-based monomers such as (meth)acrylate ester, vinyl-based monomers such as vinylpyrrolidone, (meth)acrylates having a bridged cyclic hydrocarbon group such as isobornyl (meth)acrylate and adamantyl (meth)acrylate, and the like], bifunctional monomers [alkylene glycol di(meth)acrylates such as ethylene glycol di(meth) acrylate, propylene glycol di(meth)acrylate, butanediol di(meth)acrylate, neopentyl glycol di(meth)acrylate, and hexanediol di(meth)acrylate; (poly)alkylene glycol di(meth) acrylates such as diethylene glycol di(meth)acrylate, and dipropylene glycol di(meth)acrylate, poly oxytetramethylene glycol di(meth)acrylate; and di(meth)acrylates having a crosslinking cyclic hydrocarbon group such as tricyclodecane dimethanol di(meth)acrylate and adamantanediol di(meth)acrylate], and trifunctional or higher multifunctional monomers [trifunctional to hexafunctional monomers such as glycerin tri(meth)acrylate, trimethylolpropane tri (meth)acrylate, trimethylolethane tri(meth)acrylate, pentaerythritol tri(meth)acrylate, tris(2-hydroxyethyl)isocyanurate tri(meth)acrylate, ditrimethylolpropane tetra(meth) acrylate, pentaerythritol tetra(meth)acrylate, dipentaerythritol penta(meth)acrylate, and dipentaerythritol hexa(meth)acrylate, and the like]. Among these polymers, the multifunctional (meth)acrylates having at least two (meth)acryloyl groups are widely used.

Examples of the oligomer or the resin include (meth) acrylates of a bisphenol A alkylene oxide adduct, epoxy (meth)acrylates [multifunctional epoxy (meth)acrylates having two or more (meth)acryloyl groups], polyester (meth) acrylates [multifunctional polyester (meth)acrylates having two or more (meth)acryloyl groups], urethane (meth)acrylates [multifunctional urethane (meth)acrylates having two or more (meth)acryloyl groups], silicone (meth)acrylates [multifunctional silicone (meth)acrylates having two or more (meth)acryloyl groups], and (meth)acrylic-based polymers having a polymerizable group.

These fluorine-free photocurable resins may be used alone or in combination of two or more. Among these fluorine-free photocurable resins, from the perspective of mechanical properties of the anti-glare layer, bifunctional or higher multifunctional monomers may be used, trifunctional or higher multifunctional monomers are preferable, trifunctional to hexafunctional monomers [in particular, multifunctional (meth)acrylates having from 3 to 6 (meth)acryloyl groups such as pentaerythritol tetra(meth)acrylate] are more preferable, and trifunctional to pentafunctional monomers (in particular, tetrafunctional monomers) are still more preferable.

The fluorine-free photocurable resin preferably contains a bifunctional or higher multifunctional monomer, in particular, a trifunctional to pentafunctional monomer, at a content of 50 mass % or greater, more preferably 80 mass % or greater, and still more preferably 90 mass % or greater. The fluorine-free curable resin may contain only a bifunctional or higher multifunctional monomer.

The fluorine-containing photocurable resin may be a fluoride of a monomer or an oligomer that is the fluorine-free photocurable resin. Examples of the fluorine-containing photocurable resin include: fluorinated alkyl (meth)acrylates, such as perfluorooctylethyl (meth)acrylate and trifluoroethyl (meth)acrylate; and fluorinated (poly)alkylene glycol di(meth)acrylates, such as fluoroethylene glycol di(meth)acrylate, fluoropolyethylene glycol di(meth)acrylate, and fluoropropylene glycol di(meth)acrylate; fluorine-containing epoxy (meth)acrylates; and fluorine-containing urethane (meth)acrylates. The fluorine-containing photocurable resin may be a commercially available fluorine-based polymerizable leveling agent.

These fluorine-containing photocurable resins may be used alone or in combination of two or more. Among these fluorine-containing photocurable resins, fluoropolyether compounds having a (meth)acryloyl group and fluorine-containing urethane (meth)acrylates are preferable, and fluorine-containing and ester-containing urethane (meth)acrylates are particularly preferable.

The photocurable resin preferably contains at least the fluorine-free photocurable resin, and a combination of the fluorine-free photocurable resin and the fluorine-containing photocurable resin is particularly preferable. The proportion of the fluorine-free photocurable resin in the photocurable resin may be 50 mass % or greater, preferably 80 mass % or greater, and more preferably 90 mass % or greater.

In a case where the fluorine-free photocurable resin and the fluorine-containing photocurable resin are combined, the proportion of the fluorine-containing photocurable resin is, for example, from 0.1 to 10 parts by mass, preferably from 0.2 to 8 parts by mass, more preferably from 0.3 to 6 parts by mass, and still more preferably from 0.4 to 5 parts by mass per 100 parts by mass of the fluorine-free photocurable resin. If the proportion of the fluorine-containing photocurable resin is too small, the antireflection property may deteriorate, and if the proportion is too large, the mechanical properties may deteriorate. Surprisingly, in the present disclosure, the surface roughness of the anti-glare layer increases by blending a fluorine-containing photocurable resin, which is a fluorine compound generally used as a leveling agent to reduce surface tension. Therefore, by blending the fluorine-containing photocurable resin at an appropriate proportion, the recesses and protrusions are formed on the surface of the anti-glare layer that can simultaneously achieve the anti-glare properties and the antireflection property in combination with the low refractive index layer.

Polymer Component

As the polymer component, a thermoplastic resin is typically used. The thermoplastic resin is not particularly limited as long as it has high transparency and can form the above-described recesses and protrusions on the surface through spinodal decomposition, and examples of the thermoplastic resin include: styrene-based resins; (meth)acrylic-based polymers; organic acid vinyl ester-based polymers; vinyl ether-based polymers; halogen-containing resins; poly olefins, which includes alicyclic polyolefins; poly carbonates; polyesters; polyamides; thermoplastic polyurethanes; polysulfone-based resins, such as polyether sulfones and polysulfones; polyphenylene ether-based resins, such as a polymer of 2,6-xylenol; cellulose derivatives, such as cellulose esters, cellulose carbamates, and cellulose ethers; silicone resins, such as poly dimethylsiloxane and polymethylphenylsiloxane; and rubber and elastomers, such as diene-based rubber such as polybutadiene and polyisoprene, styrene-butadiene copolymers, acrylonitrile-butadiene copolymers, acrylic rubber, urethane rubber, and silicone rubber. These thermoplastic resins can be used alone or in a combination of two or more. Among these polymer components, a combination of a (meth)acrylic-based polymer and a polyester is preferable from the perspective of forming the recesses and protrusions easily on the surface.

As the (meth)acrylic-based polymer, a homopolymer or a copolymer of a (meth)acrylic-based monomer, or a copolymer of a (meth)acrylic-based monomer and a copolymerizable monomer may be used. Examples of the (meth)acrylate monomer include: (meth)acrylic acid; $C_{1-10}$ alkyl (meth) acrylate such as methyl (meth)acrylate, ethyl (meth)acrylate, butyl (meth)acrylate, t-butyl (meth)acrylate, isobutyl (meth) acrylate, hexyl (meth)acrylate, octyl (meth)acrylate, and 2-ethylhexyl (meth)acrylate; aryl (meth)acrylate such as phenyl (meth)acrylate; hydroxyalkyl (meth)acrylates such as hydroxyethyl (meth)acrylate and hydroxypropyl (meth) acrylate; glycidyl (meth)acrylate; N,N-dialkylaminoalkyl (meth)acrylate; (meth)acrylonitrile; and (meth)acrylate having an alicyclic hydrocarbon group such as tricyclodecane. Examples of the copolymerizable monomer include the above-described styrene-based monomers, vinyl ester-based monomers, maleic anhydride, maleic acid, and fumaric acid. These monomers may be used alone or in a combination of two or more.

Examples of the (meth)acrylic-based polymer can include poly(meth)acrylates such as methyl poly(meth)acrylate and ethyl poly(meth)acrylate, methyl (meth)acrylate-(meth) acrylate copolymers, methyl (meth)acrylate-(meth)acrylic acid copolymers, methyl (meth)acrylate-(meth)acrylate copolymers, methyl (meth)acrylate-acrylate-(meth)acrylate copolymers, and (meth)acrylate-styrene copolymers (such as an MS resin).

Among these (meth)acrylic-based polymers, the polymers are preferable that includes $C_{1-6}$ alkyl (meth)acrylates such as methyl (meth)acrylate, in particular, $C_{1-4}$ alkyl acrylates.

The (meth)acrylic-based polymer has a glass transition temperature of, for example, from 0 to 200° C., preferably from 30° C. to 200° C., and more preferably from 50 to 180° C.

Examples of the polyester include aromatic polyesters in which an aromatic dicarboxylic acid such as terephthalic acid is used. This is exemplified by: homopolyesters including poly-$C_{2-4}$-alkylene terephthalate, such as polyethylene terephthalate and polybutylene terephthalate; and poly-$C_{2-4}$-alkylene naphthalate; and copolyesters containing a $C_{2-4}$ alkylene arylate unit, which is a $C_{2-4}$ alkylene terephthalate and/or $C_{2-4}$ alkylene naphthalate unit, as a main component at a content of, for example, 50 mass % or greater. The copolyesters include copolyesters in which a part of $C_{2-4}$ alkylene glycol among the constituent units of poly-$C_{2-4}$ alkylene arylate is substituted with polyoxy $C_{2-4}$ alkylene glycol, $C_{6-10}$ alkylene glycol, an alicyclic diol such as cyclohexanedimethanol or hydrogenated bisphenol A, a diol having an aromatic ring, such as 9,9-bis(4-(2-hydroxyethoxy)phenyl)fluorene having a fluorene side chain, bisphenol A, or a bisphenol A-alkylene oxide adduct, and copolyesters in which a part of an aromatic dicarboxylic acid is substituted with an asymmetric aromatic dicarboxylic acid such as phthalic acid or isophthalic acid, an aliphatic $C_{6-12}$ dicarboxylic acid such as adipic acid, or the like. The polyesters also include polyarylate-based resins, aliphatic polyesters in which an aliphatic dicarboxylic acid such as adipic acid is used, and homopolymers and copolymers of a lactone such as ε-caprolactone. The polyester may be modified, and may be a urethane modified polyester modified with polyester-based urethane or polyether-based urethane.

Among these polyesters, non-crystalline copolyesters, such as $C_{2-4}$ alkylene arylate-based copolyester, are preferable, and from the perspective of promoting phase separation through spinodal decomposition, urethane modified polyesters (in particular, urethane modified aromatic polyesters and urethane modified co-polyesters) are particularly preferable.

The mass ratio of the (meth)acrylic-based polymer to the polyester in particular, the urethane modified polyester, (meth)acrylic-based resin/polyester is from 90/10 to 10/90, preferably from 80/20 to 20/80, more preferably from 70/30 to 30/70, and still more preferably from 60/40 to 40/60. If the proportion of the (meth)acrylic-based resin is too small, the recesses and protrusions may be difficult to form, and if the proportion is too large, the recesses and protrusions may be also difficult to form.

The proportion of the polymer component is, for example, from 10 to 200 parts by mass, preferably from 30 to 100 parts by mass, more preferably from 40 to 80 parts by mass, and still more preferably from 50 to 70 parts by mass per 100 parts by mass of the curable resin. If the proportion of the polymer component is too small, the recesses and protrusions may be difficult to form, and if the proportion is too large, the recesses and protrusions may be also difficult to form.

Curing Agent

The curable composition may further contain a curing agent depending on the kind of the curable resin. For example, the thermosetting resin may include a curing agent such as amines and polyvalent carboxylic acids, and the photocurable resin may include a photopolymerization initiator. Examples of the photopolymerization initiator include commonly used components such as acetophenones, propiophenones, benzyls, benzoins, benzophenones, thioxanthones, and acylphosphine oxides.

The proportion of the curing agent such as a photopolymerization initiator is, for example, from 0.1 to 20 parts by mass, preferably from 0.5 to 10 parts by mass, and more preferably from 1 to 5 parts by mass per 100 parts by mass of the curable resin.

The curable composition may further contain a curing accelerator. For example, the photocurable resin may include a photocuring accelerator, for example, tertiary amines, such as a dialkylaminobenzoate, and a phosphine-based photopolymerization accelerator.

Additional Component

The curable composition may further contain another component in addition to the curable resin, the polymer component, and the curing agent. As another component, a commonly used additive may be contained, and examples of the commonly used additive include coupling agents such silane coupling agents, such as silane coupling agents having a thiol group, leveling agents, stabilizers, such as antioxidants and ultraviolet absorbing agents, surfactants, water-soluble polymers, fillers, cross-linking agents, coloring agents, flame retardants, lubricants, waxes, preservatives, viscosity modifiers, thickening agents, and antifoaming agents.

The proportion of another component may be selected in the range of, for example, approximately from 0.01 to 100 parts by mass, and is, for example, from 0.1 to 10 parts by mass, in particular, from 0.5 to 5 parts by mass, per 100 parts by mass of the curable resin.

In an embodiment of the present disclosure, the curable composition is preferably substantially free of a particle, and is particularly preferably free of a particle from the perspective of forming the recesses and protrusions easily and, at the same time, reducing haze.

Low Refractive Index Layer

In an embodiment of the present disclosure, the anti-glare layer may be further laminated with a low refractive index layer, which is an antireflective layer. In an embodiment of the present disclosure, lamination of a low refractive index layer is achieved with high fit to the recesses and protrusions on the anti-glare layer surface, and therefore the antireflection property is also improved, and the anti-glare properties are improved to a high degree.

The absolute value of the arithmetic mean peak curvature Spc of the low refractive index layer surface is to be 1.5 $mm^{-1}$ or less, and is, for example, from 0.1 to 1.5 $mm^{-1}$, preferably from 0.3 to 1 $mm^{-1}$, more preferably from 0.4 to 0.8 $mm^{-1}$, and still more preferably from 0.5 to 0.7 $mm^{-1}$. If the absolute value of Spc is too large, the antireflection property may deteriorate.

In an embodiment of the present disclosure, a low refractive index layer having high fit to the recesses and protrusions of the anti-glare layer is formed, and therefore the difference between the absolute value of Spc of the anti-glare layer and the absolute value of Spc of the low refractive index layer is small. The absolute value of Spc of the low refractive index layer may be from 0.3 to 2 times the absolute value of Spc of the anti-glare layer, and may be, for example, from 0.5 to 1.5 times, preferably from 0.6 to 1.2 times, more preferably from 0.8 to 1.1 times, and still more preferably from 0.9 to 1 times.

The arithmetic mean height Sa of the low refractive index layer surface may be 0.03 µm or greater, and is, for example, from 0.03 to 0.1 μm, preferably from 0.033 to 0.08 μm, more preferably from 0.035 to 0.07 μm, and still more preferably from 0.038 to 0.05 μm. If Sa is too small, the antireflection property may deteriorate.

The difference between Sa of the anti-glare layer and Sa of the low refractive index layer is also small, and Sa of the low refractive index layer may be from 0.3 to 2 times Sa of the anti-glare layer, and may be, for example, from 0.5 to 1.5 times, preferably from 0.6 to 1.2 times, more preferably from 0.8 to 1.1 times, and still more preferably from 0.9 to 1 times.

The root mean square slope Sdq of the low refractive index layer surface may be 0.007 or less, and is, for example, from 0.001 to 0.007, preferably from 0.002 to 0.006, more preferably from 0.0025 to 0.005, and still more preferably from 0.003 to 0.004. If Sdq is too large, the antireflection property may deteriorate.

The difference between Sdq of the anti-glare layer and Sdq of the low refractive index layer is also small, and Sdq of the low refractive index layer may be from 0.3 to 2 times Sdq of the anti-glare layer, and may be, for example, from 0.5 to 1.5 times, preferably from 0.6 to 1.2 times, more preferably from 0.8 to 1.1 times, and still more preferably from 0.9 to 1 times.

The developed interfacial area ratio Sdr of the low refractive index layer surface may be 0.003% or less, and is, for example, from 0.0001 to 0.003%, preferably from 0.0002 to 0.002%, more preferably from 0.0003 to 0.0015%, and still more preferably from 0.0005 to 0.001%. If Sdr is too large, the antireflection property may deteriorate.

The difference between Sdr of the anti-glare layer and Sdr of the low refractive index layer is also small, and Sdr of the low refractive index layer may be from 0.2 to 2 times Sdr of the anti-glare layer, and may be, for example, from 0.3 to 1.5 times, preferably from 0.5 to 1.2 times, more preferably from 0.6 to 1.1 times, and still more preferably from 0.8 to 1 times.

In an embodiment of the present disclosure, the anti-glare properties by the light scattering function and the antireflection property are improved in a well-balanced manner by combining Sa, Sdq, and Sdr in the above-described ranges with Spc having the above-described range on the recesses and protrusions on the low refractive index layer surface.

The refractive index of the low refractive index layer may be 1.37 or greater, and is not particularly limited as long as it is smaller than the refractive index of the anti-glare layer. The refractive index of the low refractive index layer is, for example, from 1.37 to 1.45, preferably from 1.37 to 1.4, more preferably from 1.37 to 1.39, and still more preferably from 1.37 to 1.38. If the refractive index is too high, the antireflection property may deteriorate.

The thickness (average thickness) of the low refractive index layer is, for example, from 50 to 300 nm, preferably from 60 to 150 nm, more preferably from 80 to 120 nm, and still more preferably from 90 to 110 nm.

The low refractive index layer is to have a lower refractive index than the anti-glare layer and to have the above-described properties and the properties of the optical laminate described below. The material of the low refractive index layer is not particularly limited, and a commonly used low refractive index layer, or antireflective layer, may be used.

As the commonly used low refractive index layer, for example, the low refractive index layers described in JP 2001-100006 A, JP 2008-58723 A, and WO 2016/039125 can be used. The low refractive index layer may be formed using a composition containing a low refractive index resin, or may be formed using a cured product of a composition containing a curable resin and a fluorine-containing compound or a low refractive index inorganic filler.

Examples of the low refractive index resin include a methyl pentene resin, a diethylene glycol bis(allyl carbonate) resin, and fluororesins such as polyvinylidene fluoride (PVDF) and polyvinyl fluoride (PVF).

Examples of the curable resin include the fluorine-free photocurable resins given as an example in the section on the anti-glare layer.

Examples of the fluorine-containing compound include the fluorine-containing photocurable resins given as an example in the section on the anti-glare layer.

The proportion of the fluorine-containing compound in the composition that forms the low refractive index layer may be, for example, 1 mass % or greater, and may be, for example, from 5 to 90 mass % based on the total amount of the composition.

As the low refractive index inorganic filler, for example, the filler described in JP 2001-100006 A above can be used, but low refractive index fillers such as silica and magnesium fluoride are preferable, and silica is particularly preferable. The silica may be hollow silica described in JP 2001-233611 A, JP 2003-192994 A, and the like. Among these fillers, hollow silica is preferable from the perspective of suppressing an increase in haze and improving the transparency.

The inorganic filler, including hollow silica in particular, has a number average particle size of 100 nm or less, preferably 80 nm or less (for example, from 10 to 80 nm), and more preferably approximately from 20 to 70 nm.

The proportion of the low refractive index inorganic filler, including hollow silica in particular, in the composition that forms the low refractive index layer may be 1 mass % or greater, and is, for example, from 5 to 90 mass % based on the total amount of the composition. The low refractive index inorganic filler may be surface-modified with a coupling agent (e.g., titanium coupling agent or silane coupling agent). The composition containing the low refractive index inorganic filler may contain another inorganic filler, and thus the coating film strength is improved.

The composition for formation of the low refractive index layer may also further contain a curing agent and a commonly used additive that are given as an example in the section on the anti-glare layer. The preferable aspects and proportions are the same as in the anti-glare layer.

Light-Transmitting Substrate

The light-transmitting substrate is to be formed using a transparent material. The transparent material may be selected according to use and may be an inorganic material such as glass, but an organic material is widely used from the perspective of strength and moldability. Examples of the organic material include a cellulose derivative, polyester, poly amide, polyimide, polycarbonate, and a (meth)acrylic-based polymer. Among these organic materials, a cellulose derivative, a polyester, a polycarbonate, and the like are widely used, and a cellulose ester, a polyester, and a polycarbonate are preferable.

Examples of the cellulose ester include cellulose acetate such as cellulose triacetate (TAC), and cellulose acetate $C_{3-4}$ acylate such as cellulose acetate propionate and cellulose acetate butyrate.

Examples of the polyester include polyalkylene arylates such as polyethylene terephthalate (PET) and polyethylene naphthalate (PEN).

Examples of the polycarbonate include bisphenol-based polycarbonates such as bisphenol A-based polycarbonates.

Among these organic materials, cellulose acetates such as TAC are preferable from the perspective of achieving an excellent balance among properties such as mechanical properties, transparency, and optical isotropy.

The light-transmitting substrate may also include a commonly used additive given as an example in the section on the anti-glare layer. The preferable aspect and proportion are the same as in the anti-glare layer.

The light-transmitting substrate may be a uniaxially or biaxially stretched film, but may also be an unstretched film from the perspective of having low birefringence and excellent optical isotropy.

The light-transmitting substrate may be subjected to a surface treatment, an example of which includes a corona discharge treatment, a flame treatment, a plasma treatment, and an ozone or ultraviolet irradiation treatment, and may have an easily adhesive layer.

The thickness (average thickness) of the light-transmitting substrate is, for example, from 5 to 2,000 μm, preferably from 15 to 1,000 μm, and more preferably from 20 to 500 μm.

Properties of Optical Laminate

In the optical laminate according to an embodiment of the present disclosure, the transmission image clarity measured using an optical comb having a comb width of 0.5 mm is 85% or less. In the present disclosure, the anti-glare layer surface has the recesses and protrusions, and the transmission image clarity of the optical laminate is adjusted, and thus the anti-glare properties are improved.

The transmission image clarity with optical comb having a comb width of 0.5 mm of the optical laminate is to be 85% or less, and is, for example, from 30 to 85%, preferably from 50 to 83%, more preferably from 60 to 82%, and still more preferably from 70 to 80%. If the transmission image clarity is too high, the anti-glare properties deteriorate.

Transmission image clarity is a scale for quantifying blur and distortion of light transmitted through a film. Transmission image clarity is determined by measuring light transmitted through a film through a moving optical comb and calculating the value from the amount of light in the light and dark portions of the optical comb. In other words, when light is blurred by a film, the slit image formed on the optical comb is thicker. Thus, the amount of light in the transmitting portion is 100% or less, and the amount of light in the non-transmitting portion is 0% or greater due to leakage of light. A value C for transmission image clarity is defined by the following formula from a maximum value M of transmitted light of a transparent portion of the optical comb and a minimum value m of transmitted light of a non-transparent portion of the optical comb.

$$C(\%)=[(M-m)/(M+m)]\times 100$$

In other words, values of C closer to 100% mean less blurring of the image by the anti-glare film (Reference Document: Suga and Mitamura, Coating Technology, July 1985 edition).

Note that in the present specification including claims, the transmission image clarity can be measured by a method according to JIS K7105, and more specifically, can be measured by a method described in Examples below.

In an embodiment of the present disclosure, the optical laminate has excellent transparency. The haze value of the optical laminate may be 5% or less, or in particular, 1% or less, and is, for example, from 0.01 to 1%, preferably from 0.05 to 0.8%, more preferably from 0.1 to 0.5%, and still more preferably from 0.2 to 0.4%. In a preferable embodiment of the present disclosure, the anti-glare properties can also be improved despite the above-described low haze value.

The total light transmittance of the optical laminate is, for example, 70% or greater (e.g., from 70 to 100%), preferably from 90 to 99%, more preferably from 92 to 98%, and still more preferably from 93 to 97%. When the total light transmittance is too low, transparency may be reduced.

Note that in the present specification including claims, the haze and the total light transmittance can be measured by a method according to JIS K7136, and more specifically, can be measured by a method described in Examples below.

The optical laminate including lamination of the low refractive index layer has an excellent antireflection property. The luminous reflectance of the optical laminate including lamination of the low refractive index layer is to be 1.7 or less when measured from the low refractive index layer side, but is preferably 1.4 or less from the perspective of antireflection property. The preferable range of the luminous reflectance may be selected from the range of approximately from 0.01 to 1.4, and is, for example, from 0.05 to 1.3, preferably from 0.1 to 1.2, more preferably from 0.2 to 1.1, and still more preferably from 0.3 to 1. If the luminous reflectance is too high, reflected light reduces the visibility.

Note that in the present specification including claims, the luminous reflectance can be measured by a method according to JIS Z8722, and more specifically, can be measured by a method described in Examples below.

In the optical laminate including lamination of the low refractive index layer, the spectral reflectance shows the minimum value at a wavelength of, for example, from 380 to 780 nm, preferably from 400 to 700 nm, more preferably from 450 to 650 nm, and still more preferably from 500 to 600 nm.

Note that in the present specification including claims, the spectral reflectance can be measured by a method according to JIS Z8722, and more specifically, can be measured by a method described in Examples below.

The optical laminate may include, in addition to the anti-glare layer and the low refractive index layer, a commonly used functional layer such as a polarizing layer, a refractive index-adjusting layer, or an adhesive layer.

The thickness (average thickness) of the optical laminate is, for example, from 3 to 2000 μm, preferably from 5 to 1000 μm, and more preferably from 10 to 500 μm.

Method of Producing Optical Laminate

A method of producing the optical laminate includes an anti-glare layer forming step for the formation of the anti-glare layer having recesses and protrusions on its surface. The anti-glare layer forming step is not particularly limited as long as the anti-glare layer surface having recesses and protrusions is formed, and a common method can be used.

Examples of the common method include a method of forming recesses and protrusions using particles, such as a method in which the shape of particles is fit to form protrusions, a method of forming recesses and protrusions on the surface by phase separation through liquid phase spinodal decomposition, which is a method in which a curable composition containing a resin component that can be phase-separated is cured after phase-separating the resin component, a method of transferring recesses and protrusions using a mold having a surface including recesses and protrusions, a method of forming recesses and protrusions by cutting (e.g., the cutting in which a laser or the like is used), a method of forming recesses and protrusions by polishing (e.g., by a sand blasting method or a bead shot method), and a method of forming recesses and protrusions by etching.

Among these methods, a method of forming recesses and protrusions on the surface by phase separation through liquid phase spinodal decomposition is preferable from the perspective of productivity and the like. In the method in which phase separation by liquid phase spinodal decomposition is used, desired recesses and protrusions on the anti-glare layer surface (recesses and protrusions due to phase separation structure) may be formed by phase separation through spinodal decomposition (liquid phase spinodal decomposition) in a composition including resin components that is phase-separated and a solvent. The method includes a process of evaporating or removing the solvent, by drying or the like, from the liquid phase of the composition, and in the process, the phase separation is caused by increase in the concentration.

The combination of resin components that is phase-separated may be a combination of photocurable resins given as an example in the section on the anti-glare layer, a combination of the photocurable resin and a polymer component given as an example in the section on the anti-glare layer (thermoplastic resin), or a combination of the polymer components, but from the perspective of forming desired recesses and protrusions on the anti-glare layer surface easily, preferable combination is a combination of the curable resin, such as a combination of a multifunctional (meth)acrylate having 3 to 5 (meth)acryloyl groups and a fluorine-containing photocurable compound, the (meth) acrylic-based polymer, such as methyl polymethacrylate, and the polyester, such as the urethane modified polyester.

The solvent used in liquid phase spinodal decomposition is selected according to the kind and the solubility of the resin component, and is to be a solvent capable of uniformly dissolving at least the solid contents, such as the photocurable resin, the polymer component, and the curing agent. Examples of such solvents include ketones (e.g., acetone, methyl ethyl ketone, methyl isobutyl ketone, cyclohexanone, and the like), ethers (e.g., dioxane, tetrahydrofuran, and the like), aliphatic hydrocarbons (e.g., hexane and the like), alicyclic hydrocarbons (e.g., cyclohexane and the like), aromatic hydrocarbons (e.g., toluene, xylene, and the like), halogenated carbons (e.g., dichloromethane, dichloroethane, and the like), esters (e.g., methyl acetate, ethyl acetate, butyl acetate, and the like), water, alcohols (e.g., ethanol, isopropanol, butanol, cyclohexanol, and the like), cellosolves [e.g., methyl cellosolve, ethyl cellosolve, propylene glycol monomethyl ether (e.g., 1-methoxy-2-propanol), and the like], cellosolve acetates, sulfoxides (e.g., dimethyl sulfoxide and the like), and amides (e.g., dimethylformamide, dimethylacetamide, and the like). In addition, the solvent may be a mixed solvent. Among these solvents, aliphatic ketones such as methyl ethyl ketone and methyl isobutyl ketone are preferable.

The concentration of the solutes, such as the photocurable resin, the polymer component, and the curing agent, in the composition is selected within the range in which the castability, the coating property, and the like are not impaired, and is, for example, from 1 to 80 mass %, preferably from 10 to 70 mass %, more preferably from 20 to 50 mass %, and still more preferably from 30 to 40 mass %.

Examples of the application method include known methods such as a roll coater, an air knife coater, a blade coater, a rod coater, a reverse coater, a bar coater, a comma coater, a dip squeeze coater, a die coater, a gravure coater, a micro gravure coater, a silk screen coater method, a dip method, a spray method, and a spinner method. Among these methods, the bar coater method or the gravure coater method are widely used. If necessary, the coating solution may be applied a plurality of times.

After the composition is cast or applied, the resulting product may be dried to evaporate the solvent. The resulting product may be dried naturally, or may be dried at a temperature selected in the range of, for example, approximately from 30 to 200° C. according to the boiling point of the solvent. From the perspective of forming desired recesses and protrusions on the anti-glare layer surface easily, the temperature is preferable from 60 to 100° C., more preferably from 70 to 90° C., and still more preferably from 75 to 85° C.

The optical laminate is obtained, after the drying, through curing by light irradiation. The light used for irradiation is selected according to the kind and the like of the photocurable resin, and typically, ultraviolet rays, electron beams, and the like may be used. A commonly used light source is typically an ultraviolet irradiation device.

Examples of the light source include a deep UV lamp, a low-pressure mercury lamp, a high-pressure mercury lamp, an ultrahigh-pressure mercury lamp, a halogen lamp, and a laser light source (light source such as a helium-cadmium laser and an excimer laser) in the case of the ultraviolet rays. The amount of irradiation light (or in another word, the amount of irradiation energy as the integrated light amount) depends on the thickness of the coating film, and is, for example, from 10 to 10000 $mJ/cm^2$, preferably from 20 to 5000 $mJ/cm^2$, and more preferably from 30 to 3000 $mJ/cm^2$. As necessary, the light irradiation may be performed in an inert gas atmosphere.

Examples of the method in which phase separation is used include the methods described in JP 2007-187746 A, JP 2008-225195 A, JP 2009-267775 A, JP 2011-175601 A, JP 2014-85371 A, JP 2014-92657 A, JP 2014-98771 A, JP 2016-161859 A, and JP 2017-219622 A.

In a case where the optical laminate includes a low refractive index layer, the method for producing the optical laminate further includes a low refractive index layer forming step of laminating an anti-glare layer with a low refractive index layer.

As a method of laminating with a low refractive index layer, a commonly used method may be used, and a method may be used in which a composition that forms a low refractive index layer is dissolved or dispersed in a solvent to obtain a coating solution, and the coating solution is applied and the resulting product is dried. In a case where the composition contains a photocurable resin, the composition is cured after the drying in the same manner as in the anti-glare layer. The coating method, the drying method, and preferable aspects thereof are the same as in the anti-glare layer.

As the solvent, the solvents used in liquid phase spinodal decomposition of the anti-glare layer may be used. Among the solvents, alcohols such as isopropanol (e.g., 2-propanol) are preferable.

The concentration of the solutes, such as the resin component and the inorganic filler, in the composition may be selected in the range approximately from 0.1 to 50 mass % within the range in which the castability, the coating property, and the like are not impaired. From the perspective of forming desired recesses and protrusions on the anti-glare layer surface easily, the concentration is, for example, from 1 to 3 mass %, preferably from 1.5 to 3 mass %, more preferably from 1.8 to 3 mass %, and still more preferably from 2 to 3 mass %.

Display Device

The optical laminate has excellent anti-glare properties. Therefore, the optical laminate may be used in various display devices such as liquid crystal display devices (LCDs) and organic EL displays, and are particularly useful as a high-definition LCD or organic EL display.

In particular, the LCD may be a reflective LCD that utilizes external light to illuminate a display unit including liquid crystal cells or may be a transmissive LCD with a backlight unit configured to illuminate the display unit. In a reflective LCD, incident light is introduced from the exterior through the display unit, and transmitted light transmitted through the display unit is reflected by a reflective member to illuminate the display unit. In a reflective LCD, the optical laminate is disposed in an optical path forward from the reflective member. For example, the optical laminate is disposed at or layered on the front surface, which is a visual viewing side front surface, of the display unit, and in particular, may be disposed at the front surface of an LCD with a collimated backlight unit and without a prism sheet.

In a transmissive LCD, the backlight unit may include a light guide plate, for example, a light guide plate having a wedge-shaped cross section, for allowing a light from a light source (a tubular light source such as a cold-cathode tube, a point light source such as a light emitting diode, or the like) incident from one side to emit from the front output surface. Also, as necessary, a prism sheet may be disposed at the front surface side of the light guide plate. Note that, typically, on the back surface of the light guide plate, a reflective member for reflecting light from a light source toward the output surface is disposed. In such a transmissive LCD, the optical laminate is typically disposed in an optical path forward from the light source, and, for example, is disposed at or layered on the front surface of the display unit.

In an organic EL display, an organic EL includes a light emitting element constituted for each pixel, and this light emitting element is typically formed of a negative electrode of a metal or the like/an electron-injecting layer/an electron-transporting layer/a light emitting layer/a hole-transporting layer/a hole-injecting layer/a positive electrode of indium tin oxide (ITO) or the like/a substrate such as a glass plate or a transparent plastic plate. Also in an organic EL display, the optical laminate may be disposed in an optical path.

Each aspect disclosed in the present specification can be combined with any other feature disclosed herein.

EXAMPLES

Hereinafter, the present disclosure is described in greater detail based on examples, but the present disclosure is not limited to these examples. Details of the raw materials and the films used in Examples and Reference Examples and the method of preparing the coating solution are as follows, and the optical laminates obtained in Examples and Reference Examples were evaluated with the method described below.

Raw Materials

Acrylic-based polymer: "8KX-077", available from Taisei Fine Chemical Co., Ltd.

Urethane modified co-polyester resin: "VYLON (trade name) UR-3500", available from TOYOBO CO., LTD.

Pentaerythritol tetraacrylate (PETRA): "PETRA", available from DAICEL-ALLNEX LTD.

Fluorine-based compound having polymerizable group: "Ftergent 602A" available from Neos Company Limited Photoinitiator: "Omnirad 184", available from IGM Resins Cellulose triacetate (TAC) film: "FUJITACTG60UL" available from FUJIFILM Corporation.

Hollow silica-containing coating agent: "P-5062", available from JGC Catalysts and Chemicals Ltd.

Coating agent containing acrylic fine particles: "FA-3155M", available from NIPPON KAKO TORYO CO., LTD.

Clear hard coating agent 1: "FA-3155 Clear", available from NIPPON KAKO TORYO CO., LTD.

Clear hard coating agent 2: "Z7503", available from ARAKAWA CHEMICAL INDUSTRIES, LTD.

Thickness of Anti-Glare Layer

In the laminate obtained in Examples and Reference Examples, arbitrary 10 portions were measured using an optical film thickness meter, and the average value was calculated.

Surface Topography

The surface (anti-glare layer surface or antireflective layer surface) was measured in accordance with ISO 25178 using an optical surface roughness meter ("VertScan R5500G", available from Hitachi High-Tech Science Corporation) under the conditions of a 2.5 mm square scanning range and 2 scanning times to determine the arithmetic mean height Sa, the root mean square slope Sdq, the developed interfacial area ratio Sdr, and the arithmetic mean peak curvature Spc.

Haze and Total Light Transmittance

The haze was measured in accordance with JIS K7136 using a haze meter (HM-150L2, available from Murakami Color Research Laboratory), with the film front surface having the recesses and protrusions structure being disposed facing the light receiver.

Transmission Image Clarity

The transmission image clarity was measured in accordance with JIS K7105 using a mapping measuring instrument ("ICM-1T", available from Suga Test Instruments Co., Ltd.) under a condition in which the film is installed, and thus the film-forming direction of the film and the comb tooth direction of the optical comb were parallel with each other. The optical comb width was set to 0.5 mm.

Spectral Reflectance and Luminous Reflectance Y

The spectral reflectance and the luminous reflectance were measured in accordance with JIS Z8722 using a spectrophotometer ("U-3900H", available from Hitachi High-Tech Science Corporation). In the measured film, the surface opposite from the antireflective layer was attached to a commercially available black acrylic plate with an optical adhesive to minimize the influence from reflections from the back surface as much as possible.

Anti-glare Properties

The obtained film was attached to a commercially available black acrylic plate with an optical adhesive, and the reflection image when illuminated by a three-wavelength fluorescent lamp was visually checked and evaluated according to the following criteria.

⊚ (Excellent): The reflection image is strongly blurred, and the boundary line between the fluorescent light and the outside cannot be distinguished at all.

○ (Good): The reflection image is blurred, but the boundary line between the fluorescent light and the outside can be slightly distinguished.

Δ (Marginal): The reflection image is little blurred, and the boundary line between the fluorescent light and the outside can be almost distinguished.

x (Poor): The reflection image is not blurred, and the boundary line between the fluorescent light and the outside can be completely distinguished.

Refractive Index

The refractive index was measured in accordance with JIS K7142 using a refractive index meter ("Metricon Model 2010 Prism Coupler", available from Metricon Corporation) at 23° C. under the conditions of 407 nm, 633 nm (He—Ne laser), and 826 nm, and the refractive index at 589 nm was calculated.

Example 1

Twenty six parts by mass of an acrylic-based polymer, 24 parts by mass of a urethane modified co-polyester resin, 82 parts by mass of PETRA, 0.5 parts by mass of a fluorine-based compound having a polymerizable group, and 1 part by mass of a photoinitiator were dissolved in 231 parts by mass of methyl ethyl ketone. This solution was cast onto a TAC film using a wire bar #14, then the resulting product was left in an oven at 90° C. for 1 minute to evaporate the solvent, and a coating layer having a thickness of approximately 4 μm was formed. Then, the coating layer was irradiated with ultraviolet rays from a high-pressure mercury lamp in the atmosphere for approximately 5 seconds and subjected to UV curing treatment (in an integrated light amount of approximately 100 mJ/cm$^2$, the same applies hereinafter) to obtain an anti-glare film.

Example 2

A solution obtained by mixing 100 parts by mass of a hollow silica-containing coating agent and 33 parts by mass of 2-propanol was cast using a wire bar #5 onto the surface having recesses and protrusions of the film prepared in Example 1, then the resulting product was left in an oven at 80° C. for 1 minute to evaporate the solvent, and an antireflective layer (low refractive index layer) was formed. Then, the resulting product was irradiated with ultraviolet rays from a high-pressure mercury lamp in a nitrogen atmosphere for approximately 5 seconds and subjected to UV curing treatment to obtain an anti-glare/antireflective film. In the range from 380 nm to 780 nm, the spectral reflectance showed the minimum value at a wavelength of 561 nm.

Example 3

Twenty six parts by mass of an acrylic-based polymer, 24 parts by mass of a urethane modified co-polyester resin, 82 parts by mass of PETRA, 0.5 parts by mass of a fluorine-based compound having a polymerizable group, and 1 part by mass of a photoinitiator were dissolved in 231 parts by mass of methyl ethyl ketone. This solution was cast onto a TAC film using a wire bar #14, then the resulting product was left in an oven at 80° C. for 1 minute to evaporate the solvent, and a coating layer having a thickness of approximately 4 μm was formed. Then, the coating layer was irradiated with ultraviolet rays from a high-pressure mercury lamp in the atmosphere for approximately 5 seconds and subjected to UV curing treatment to obtain an anti-glare film.

Example 4

A solution obtained by mixing 100 parts by mass of a hollow silica-containing coating agent and 33 parts by mass of 2-propanol was cast using a wire bar #5 onto the surface having recesses and protrusions of the film prepared in Example 3, then the resulting product was left in an oven at 80° C. for 1 minute to evaporate the solvent, and an antireflective layer was formed. Then, the resulting product was irradiated with ultraviolet rays from a high-pressure mercury lamp in a nitrogen atmosphere for approximately 5 seconds and subjected to UV curing treatment to obtain an anti-glare/antireflective film. In the range from 380 nm to 780 nm, the spectral reflectance showed the minimum value at a wavelength of 558 nm.

Example 5

Twenty parts by mass of an acrylic-based polymer, 24 parts by mass of a urethane modified co-polyester resin, 82 parts by mass of PETRA, 0.25 parts by mass of a fluorine-based compound having a polymerizable group, and 1 part by mass of a photoinitiator were dissolved in 231 parts by mass of methyl ethyl ketone. This solution was cast onto a TAC film using a wire bar #14, then the resulting product was left in an oven at 80° C. for 1 minute to evaporate the solvent, and a coating layer having a thickness of approximately 4 μm was formed. Then, the coating layer was irradiated with ultraviolet rays from a high-pressure mercury lamp in the atmosphere for approximately 5 seconds and subjected to UV curing treatment to obtain an anti-glare film.

Example 6

A solution obtained by mixing 100 parts by mass of a hollow silica-containing coating agent and 33 parts by mass of 2-propanol was cast using a wire bar #5 onto the surface having recesses and protrusions of the film prepared in Example 5, then the resulting product was left in an oven at 80° C. for 1 minute to evaporate the solvent, and an antireflective layer was formed. Then, the resulting product was irradiated with ultraviolet rays from a high-pressure mercury lamp in a nitrogen atmosphere for approximately 5 seconds and subjected to UV curing treatment to obtain an anti-glare/antireflective film. In the range from 380 nm to 780 nm, the spectral reflectance showed the minimum value at a wavelength of 574 nm.

Example 7

Twenty parts by mass of an acrylic-based polymer, 24 parts by mass of a urethane modified co-polyester resin, 82 parts by mass of PETRA, 0.1 parts by mass of a fluorine-based compound having a polymerizable group, and 1 part by mass of a photoinitiator were dissolved in 231 parts by mass of methyl ethyl ketone. This solution was cast onto a TAC film using a wire bar #14, then the resulting product was left in an oven at 70° C. for 1 minute to evaporate the solvent, and a coating layer having a thickness of approximately 4 μm was formed. Then, the coating layer was irradiated with ultraviolet rays from a high-pressure mercury lamp in the atmosphere for approximately 5 seconds and subjected to UV curing treatment to obtain an anti-glare film.

Example 8

A solution obtained by mixing 100 parts by mass of a hollow silica-containing coating agent and 33 parts by mass of 2-propanol was cast using a wire bar #5 onto the surface having recesses and protrusions of the film prepared in Example 7, then the resulting product was left in an oven at 80° C. for 1 minute to evaporate the solvent, and an antireflective layer was formed. Then, the resulting product was irradiated with ultraviolet rays from a high-pressure mercury lamp in a nitrogen atmosphere for approximately 5 seconds and subjected to UV curing treatment to obtain an anti-glare/antireflective film. In the range from 380 nm to 780 nm, the spectral reflectance showed the minimum value at a wavelength of 567 nm.

Example 9

A solution obtained by mixing 100 parts by mass of a hollow silica-containing coating agent and 20 parts by mass of 2-propanol was cast using a wire bar #5 onto the surface having recesses and protrusions of the film prepared in Example 7, then the resulting product was left in an oven at 80° C. for 1 minute to evaporate the solvent, and an antireflective layer was formed. Then, the resulting product was irradiated with ultraviolet rays from a high-pressure mercury lamp in a nitrogen atmosphere for approximately 5 seconds and subjected to UV curing treatment to obtain an anti-glare/antireflective film. In the range from 380 nm to 780 nm, the spectral reflectance showed the minimum value at a wavelength of 388 nm.

Example 10

A solution obtained by mixing 100 parts by mass of a hollow silica-containing coating agent and 10 parts by mass of 2-propanol was cast using a wire bar #5 onto the surface having recesses and protrusions of the film prepared in Example 7, then the resulting product was left in an oven at 80° C. for 1 minute to evaporate the solvent, and an antireflective layer was formed. Then, the resulting product was irradiated with ultraviolet rays from a high-pressure mercury lamp in a nitrogen atmosphere for approximately 5 seconds and subjected to UV curing treatment to obtain an anti-glare/antireflective film. In the range from 380 nm to 780 nm, the spectral reflectance showed the minimum value at a wavelength of 389 nm.

Reference Example 1

Twenty seven parts by mass of an acrylic-based polymer, 24 parts by mass of a urethane modified co-polyester resin, 151 parts by mass of a clear hard coating agent 2, 0.1 parts by mass of a fluorine-based compound having a polymerizable group, and 1 part by mass of a photoinitiator were dissolved in 161 parts by mass of methyl ethyl ketone. This solution was cast onto a TAC film using a wire bar #14, then the resulting product was left in an oven at 80° C. for 1 minute to evaporate the solvent, and a coating layer having a thickness of approximately 5 µm was formed. Then, the coating layer was irradiated with ultraviolet rays from a high-pressure mercury lamp in the atmosphere for approximately 5 seconds and subjected to UV curing treatment to obtain an anti-glare film.

Reference Example 2

A solution obtained by mixing 100 parts by mass of a hollow silica-containing coating agent and 33 parts by mass of 2-propanol was cast using a wire bar #5 onto the surface having recesses and protrusions of the film prepared in Reference Example 1, then the resulting product was left in an oven at 80° C. for 1 minute to evaporate the solvent, and an antireflective layer was formed. Then, the resulting product was irradiated with ultraviolet rays from a high-pressure mercury lamp in a nitrogen atmosphere for approximately 5 seconds and subjected to UV curing treatment to obtain an anti-glare/antireflective film. In the range from 380 nm to 780 nm, the spectral reflectance showed the minimum value at a wavelength of 554 nm.

Reference Example 3

Fifty parts by mass of a coating agent containing acrylic fine particles, 100 parts by mass of a clear hard coating agent 1, and 0.1 parts by mass of a fluorine-based compound having a polymerizable group were mixed. This solution was cast onto a TAC film using a wire bar #8, then the resulting product was left in an oven at 80° C. for 1 minute to evaporate the solvent, and a coating layer having a thickness of approximately 5 µm was formed. Then, the coating layer was irradiated with ultraviolet rays from a high-pressure mercury lamp in the atmosphere for approximately 5 seconds and subjected to UV curing treatment to obtain an anti-glare film.

Reference Example 4

A solution obtained by mixing 100 parts by mass of a hollow silica-containing coating agent and 33 parts by mass of 2-propanol was cast using a wire bar #5 onto the surface having recesses and protrusions of the film prepared in Reference Example 3, then the resulting product was left in an oven at 80° C. for 1 minute to evaporate the solvent, and an antireflective layer was formed. Then, the resulting product was irradiated with ultraviolet rays from a high-pressure mercury lamp in a nitrogen atmosphere for approximately 5 seconds and subjected to UV curing treatment to obtain an anti-glare/antireflective film. In the range from 380 nm to 780 nm, the spectral reflectance showed the minimum value at a wavelength of 585 nm.

Reference Example 5

Fifty parts by mass of a coating agent containing acrylic fine particles, 50 parts by mass of a clear hard coating agent 1, and 0.1 parts by mass of a fluorine-based compound having a polymerizable group were mixed. This solution was cast onto a TAC film using a wire bar #8, then the resulting product was left in an oven at 80° C. for 1 minute to evaporate the solvent, and a coating layer having a thickness of approximately 5 nm was formed. Then, the coating layer was irradiated with ultraviolet rays from a high-pressure mercury lamp in the atmosphere for approximately 5 seconds and subjected to UV curing treatment to obtain an anti-glare film.

Reference Example 6

A solution obtained by mixing 100 parts by mass of a hollow silica-containing coating agent and 33 parts by mass of 2-propanol was cast using a wire bar #5 onto the surface having recesses and protrusions of the film prepared in Reference Example 5, then the resulting product was left in an oven at 80° C. for 1 minute to evaporate the solvent, and an antireflective layer was formed. Then, the resulting product was irradiated with ultraviolet rays from a high-pressure mercury lamp in a nitrogen atmosphere for approximately 5 seconds and subjected to UV curing treatment to obtain an anti-glare/antireflective film. In the range from 380 nm to 780 nm, the spectral reflectance showed the minimum value at a wavelength of 508 nm.

Reference Example 7

One hundred parts by mass of a clear hard coating agent 1 and 0.1 parts by mass of a fluorine-based compound having a polymerizable group were mixed. This solution was cast onto a TAC film using a wire bar #8, then the resulting product was left in an oven at 80° C. for 1 minute to evaporate the solvent, and a coating layer having a thickness of approximately 5 nm was formed. Then, the coating layer was irradiated with ultraviolet rays from a high-pressure mercury lamp in the atmosphere for approximately 5 seconds and subjected to UV curing treatment to obtain an anti-glare film.

Reference Example 8

A solution obtained by mixing 100 parts by mass of a hollow silica-containing coating agent and 11 parts by mass of 2-propanol was cast using a wire bar #4 onto the surface having recesses and protrusions of the film prepared in Reference Example 7, then the resulting product was left in an oven at 80° C. for 1 minute to evaporate the solvent, and an antireflective layer was formed. Then, the resulting product was irradiated with ultraviolet rays from a high-pressure mercury lamp in a nitrogen atmosphere for approximately 5 seconds and subjected to UV curing treatment to obtain an anti-glare/antireflective film. In the range from 380 nm to 780 nm, the spectral reflectance showed the minimum value at a wavelength of 531 nm.

Table 1 shows the evaluation results of the anti-glare films and the anti-glare/antireflective films obtained in Examples 1 to 10, and Table 2 shows the evaluation results of the anti-glare films and the anti-glare/antireflective films obtained in Reference Examples 1 to 8.

As is seen from the results shown in Table 1, the anti-glare films and the anti-glare/antireflective films in Examples have high anti-glare properties and low haze. The anti-glare/antireflective films in Examples 2, 4, 6, and 8 to 9 have also a low luminous reflectance.

INDUSTRIAL APPLICABILITY

The optical laminate according to an embodiment of the present disclosure is used as an anti-glare film or protective film used on the surface of various display devices such as liquid crystal display devices (LCDs), cathode-ray tube display devices, organic or inorganic electroluminescence (EL) displays, field emission displays (FEDs), surface-conduction electron-emitter displays (SEDs), and rear projection television displays, and particularly suitable for applications in which high-definition images are to be achieved, such as game machines, smartphones, personal computers (PCs) (such as tablet PCs, notebook or laptop PCs, and desktop PCs), pointing devices for a computer such as pen tablets, and display devices such as televisions.

The invention claimed is:
1. An optical laminate comprising a light-transmitting substrate, and an anti-glare layer disposed on at least one side of the light-transmitting substrate, the anti-glare layer having recesses and protrusions on its surface,
   wherein the optical laminate has:
   a transmission image clarity of 75% or less, as measured by an optical comb with a comb width of 0.5 mm;

TABLE 1

| Item | Units | Examples | | | | | | | | | |
|---|---|---|---|---|---|---|---|---|---|---|---|
| | | 1 | 2 | 3 | 4 | 5 | 6 | 7 | 8 | 9 | 10 |
| Sa | μm | 0.063 | 0.081 | 0.070 | 0.040 | 0.053 | 0.049 | 0.044 | 0.041 | 0.038 | 0.047 |
| Sdq | — | 0.0050 | 0.0065 | 0.0062 | 0.0037 | 0.0056 | 0.0044 | 0.0044 | 0.0038 | 0.0041 | 0.0046 |
| Sdr | % | 0.0012 | 0.0021 | 0.0019 | 0.0007 | 0.0016 | 0.0010 | 0.0010 | 0.0007 | 0.0008 | 0.0010 |
| Spc | 1/mm | −0.94 | −0.81 | −1.17 | −0.67 | −0.92 | −0.89 | −0.63 | −0.69 | −0.75 | −0.67 |
| Haze | % | 0.3 | 0.6 | 0.4 | 0.3 | 0.4 | 0.4 | 0.3 | 0.5 | 0.5 | 0.4 |
| Total Light Transmittance | % | 92.0 | 95.1 | 92.1 | 95.2 | 92.0 | 95.3 | 92.0 | 95.2 | 94.9 | 94.8 |
| Transmission image clarity | % | 56 | 66 | 70 | 75 | 78 | 79 | 84 | 83 | 85 | 78 |
| Luminous reflectance Y | — | — | 1.1 | — | 1.0 | — | 1.0 | — | 1.1 | 1.4 | 1.7 |
| Anti-glare properties | — | Excellent | Excellent | Excellent | Excellent | Good | Good | Good | Good | Good | Good |
| Refractive index of anti-glare layer | — | 1.53 | 1.53 | 1.53 | 1.53 | 1.53 | 1.53 | 1.53 | 1.53 | 1.53 | 1.53 |
| Refractive index of low refractive index layer | — | — | 1.37 | — | 1.37 | — | 1.37 | — | 1.37 | 1.37 | 1.37 |

TABLE 2

| Item | Units | Reference Example | | | | | | | |
|---|---|---|---|---|---|---|---|---|---|
| | | 1 | 2 | 3 | 4 | 5 | 6 | 7 | 8 |
| Sa | μm | 0.071 | 0.033 | 0.030 | 0.034 | 0.057 | 0.056 | 0.010 | 0.008 |
| Sdq | — | 0.0120 | 0.0052 | 0.0144 | 0.0120 | 0.0282 | 0.0250 | 0.0004 | 0.0005 |
| Sdr | % | 0.0071 | 0.0014 | 0.0103 | 0.0072 | 0.0371 | 0.0313 | 0.0000 | 0.0000 |
| Spc | 1/mm | −3.53 | −1.78 | −10.48 | −4.98 | −75.55 | −11.97 | −0.49 | −0.59 |
| Haze | % | 1.4 | 2.1 | 9.3 | 6.7 | 28.5 | 18.7 | 0.3 | 0.3 |
| Total Light Transmittance | % | 92.3 | 94.7 | 92.4 | 95.0 | 92.0 | 94.2 | 92.1 | 95.4 |
| Transmission image clarity | % | 91 | 93 | 85 | 82 | 72 | 75 | 97 | 97 |
| Luminous reflectance Y | — | – | 1.4 | – | 1.7 | – | 2.1 | – | 1.0 |
| Anti-glare properties | — | Marginal | Marginal | Good | Good | Good | Good | Poor | Poor |
| Refractive index of anti-glare layer | — | 1.52 | 1.52 | 1.52 | 1.52 | 1.52 | 1.52 | 1.52 | 1.52 |
| Refractive index of low refractive index layer | — | – | 1.37 | – | 1.37 | – | 1.37 | – | 1.37 | an arithmetic mean peak curvature Spc of 0.5 to 1.5 mm−1 in absolute value on the surface of the anti-glare layer; and a root mean square slope Sdq of 0.007 or less on the surface of the anti-glare layer.

2. The optical laminate according to claim 1, further comprising a low refractive index layer disposed on the anti-glare layer, wherein the optical laminate has a luminous reflectance of 1.4 or less.

3. The optical laminate according to claim 2, wherein the low refractive index layer has an arithmetic mean peak curvature Spc of 1.5 mm$^-$1 or less in absolute value on its surface.

4. The optical laminate according to claim 2, wherein the absolute value of the arithmetic mean peak curvature Spc of the low refractive index layer surface is from 0.3 to 2 times the absolute value of the arithmetic mean peak curvature Spc of the glare layer surface.

5. The optical laminate according to claim 2, wherein the anti-glare layer has a refractive index of 1.53 or less, and the low refractive index layer has a refractive index of 1.37 or greater.

6. The optical laminate according to claim 1, wherein the anti-glare layer surface has a developed interfacial area ratio Sdr of 0.003% or less.

7. The optical laminate according to claim 1, wherein the anti-glare layer surface has an arithmetic mean height Sa of 0.03 um or greater.

8. The optical laminate according to claim 1, having a haze value of 1% or less.

9. The optical laminate according to claim 1, wherein the anti-glare layer is free of a particle.

10. A method of producing the optical laminate described in claim 1, the method comprising an anti-glare layer forming step of forming recesses and protrusions on a surface of the anti-glare layer by phase separation through liquid phase spinodal decomposition.

11. The method according to claim 10, further comprising a low refractive index layer forming step of disposing a low refractive index layer on the anti-glare layer.

12. A display device comprising the optical laminate described in claim 1.

13. The display device according to claim 12, wherein the display device is a liquid crystal display device or an organic electroluminescence (EL) display.

\* \* \* \* \*